United States Patent [19]

Sviokla

[11] 4,120,762

[45] Oct. 17, 1978

[54] ELECTROCHEMICAL RECORDING MEDIUM

[75] Inventor: Sylvester Charles Sviokla, Ocean Bluff, Mass.

[73] Assignee: Alden Research Foundation, Westboro, Mass.

[21] Appl. No.: 838,156

[22] Filed: Sep. 30, 1977

[51] Int. Cl.$^2$ .................... G01D 15/06; G01D 15/10; G01D 15/34
[52] U.S. Cl. ........................................ 204/2; 427/151
[58] Field of Search .................... 204/2; 427/145, 150, 427/151; 346/76 R, 135

[56] References Cited

U.S. PATENT DOCUMENTS

| | | | |
|---|---|---|---|
| 2,776,252 | 1/1957 | Schwartz | 204/2 |
| 2,983,654 | 5/1961 | Dalton | 204/2 |
| 3,108,050 | 10/1963 | Mandel | 204/2 |
| 3,344,043 | 9/1967 | Lieblich | 204/2 |
| 3,409,516 | 11/1968 | Ives | 204/2 |
| 3,632,430 | 1/1972 | Sperling | 204/2 |

*Primary Examiner*—T. M. Tufariello
*Attorney, Agent, or Firm*—Grover and Meegan

[57] ABSTRACT

An improved electrochemical recording medium is provided which comprises a support impregnated with an electrolytically conducting solution containing an electrolyte, a chelating or sequestering agent, and a marking compound; and characterized by the inclusion of a six-membered hetero-aromatic nitrogen-containing compound having at least one acidic substituent adjacent to a nitrogen atom of the hetero-aromatic ring. The hetero-aromatic compound unexpectedly provides improvement in color, tone and definition of recorded mark.

13 Claims, No Drawings

ELECTROCHEMICAL RECORDING MEDIUM

INTRODUCTION

This invention relates generally to electrolytic recording and more particularly, to an electrochemical recording medium which is stable in storage, free of background discoloration, and which is capable of recording at high speed to produce recorded marks of improved definition, tone and color.

BACKGROUND OF THE INVENTION

As is well known in the art, electrolytic recording is accomplished by passing a modulated electric current through an electrochemical recording medium comprising a support impregnated with an electrolyte, a chelating or sequestering compound, and a marking compound. Such recording medium is well known in the facsimile art.

The recording medium is known to comprise a support impregnated with an electrolyte solution. The support is usually paper, but may be of any porous material that is capable of passing an electric current subequent to impregnation with the electrolyte solution. The electrolyte solution is typically an aqueous solution of an electrolyte such as an alkali or alkaline earth metal salt, a chelating agent such as ethylenediaminetetraacetic acid (EDTA), a marking compound such as an organic acid or a polyhydroxy compound and various other additives such as stabilizers, antioxidants, and the like as is well known in the art.

Using the aforesaid recording medium, recording or marking is accomplished by passing metal ions into the medium in a selective pattern, the metal ions being released from an eroding anode by passage of a current therethrough. The ions migrate into the recording medium forming colored marks with the marking compound. Stray ions form colorless chelates with the chelating agent to prevent background ciscoloration. Electrolytic recording and media therefor of the type described above are disclosed and claimed in U.S. Pat. Nos. 3,409,516, and 3,354,058, both incorporated herein by reference.

Though the art of electrolytic recording has been known for some time, difficulties are still encountered in such recording, particularly when recording using relatively high speed recording equipment. One such difficulty involves the color, tone and definition of the recorded mark, these characteristics being degraded when recording takes place at high speeds.

SUMMARY OF THE INVENTION

The subject invention provides an electrolytic recording medium capable of producing a recorded mark of substantially improved color, tone and definition, said improvement being realized both with the more conventional facsimile as well as the newer high speed equipment.

The improvement is realized by the addition of a six-membered hetero-aromatic nitrogen-containing compound to the electrolytic recording medium of the type described above, said hetero-aromatic compound having at least one acidic substituent adjacent to a nitrogen atom. The manner in which the hetero-aromatic compound inproves a recorded mark is not fully understood, but it is believed to be the result of a synergistic reaction with the marking compound.

The electrolytic recording medium of the invention not only provides an improved recorded mark as described above, but is stable in storage, both before and after recording.

DESCRIPTION OF THE PREFERRED EMBODIMENTS

As noted above, the invention described herein relates to an improved electrochemical recording medium comprising a porous support impregnated with an aqueous electrolytic solution containing an electrolyte, a chelating or sequestering agent and a marking compound; and characterized by the inclusion of a six-membered hetero-aromatic nitrogen-containing compound having at least one acidic substituent adjacent to the nitrogen atom.

The support useful for the recording medium includes those materials well known in the prior art. Paper is preferred, but any porous material capable of impregnation with an electrolytic solution and capable of conducting current subsequent to impregnation, is suitable.

The recording medium is formed by impregnation with the electrolytic solution, typically by passing the support through a bath containing the electrolytic solution, pressure rolls being used to remove the excess solution. The treated support typically comprises about 40% by weight moisture and is preferably stored in a sealed container prior to use.

The electrolytic solution used to impregnate the support is an aqueous solution of a salt such as a salt of an alkali or alkaline earth metal, typical salts including fluorides, bromides, chlorates, nitrates, and sulfates of sodium, potassium, lithium, calcium, magnesium, rubidium, desium, and ammonium. The salt concentration may vary from as little as 2% by weight to saturation, provided it is present in sufficient concentration to produce the desired solution conductivity. Typical salts and suitable concentrations are well known in the art.

Known chelating or sequestering agents are used in the electrolyte solution to retain stray recording metal ions in colorless form at non-recording parts of the support. Preferably, these materials are aminocarbixylic acids, particularly aminocarboxylic acids such as ethylenediaminetetraacetic acid (EDTA), cihydroxyethylglycine and diethylenetriaminepentaacetic acid. Other suitable agents and their concentrations would be known to those skilled in the art, and generally may vary from about 0.05 to about 1.0% chelate per weight of solution.

Marking compounds known in the prior art to form a colored mark with the metal ions from the eroding anode are suitable for purposes set forth herein. Such marking compounds include, for example, methylenedisalicylid acid (MDA), tannic acid, gallic acid, polydroxybenzenes, methyl gallate, pyrogallic acid, protocatechuic acid, 8-hydroxyquinoline, dihydroxyphenylacetic acid (DHPAA), salicylic acid, pamoic acid and the like. Such known marking compounds may be used in concentrations over a wide range to provide specific electrical effects on recording as would be well known in the art. In order to reduce air-induced oxidation of the marking compounds during storage, stabilizers such as thiourea, allyl thiourea and the like are typically added to the electrolyte formulations.

The improved electrolytic recording medium, in accordance with the invention, is characterized by the inclusion of a six-membered hetero-aromatic nitrogen-containing compound having at least one acidic substituent adjacent to a nitrogen atom. This compound is believed to react synergistically with the marking compound to produce a mark having unexpected color and tone and enhanced definition, even when made at high recording speed.

The six-membered hetero-aromatic nitrogen-containing compounds useful in accordance with this invention may be depicted by the following general formula:

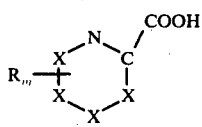

wherein each X is either nitrogen or carbon, and R is selected from the group consisting of hydrogen, halogen, hydroxyl, lower aliphatic radicals, said carboxyl, sulfo and alkoxy radicals being substituted with a member from the group of hydrogen and lower aliphatic radicals of 1-6 carbons, and $m$ is a whole integer varying between 1 and 5.

Exemplary of such hetero-aromatic compounds are 2-pyrazinecarboxylic acid (picolinic acid); 2,4-pyridinedicarboxylic acid (intidinic acid); 3-chloro-2,5-pyridinedicarboxylic acid, 3-sulfo-2,6-pyridinedicarboxylic acid; 3-pyridazinecarboxylic acid; 4-ethyl-6-pyridazinecarboxylic acid; 3-hydroxy-6-pyridazinecarboxylic acid; 6-methoxy-2-pyridazinecarboxylic acid; 4-chloro-2-pyrimadinecarboxylic acid; 6-sulfo-4-pyrimidinecarboxylic acid; 2-pyrazinecarboxylic acid; 2,3-pyrazinedicarboxylic acid, 5-carbethoxy-2-pyrazinecarboxylic acid; 1,3,5-triazine-5-carboxylic acid; and 4-hydroxy-1,3,5-triazine-2-carboxylic acid, and 1,2,4,5-tetrazine-3-carboxylic acid.

The six-membered hetero-aromatic additive is introduced into the electrolyte solution in minor amount relative to the other additives, typically in a weight of marking compound to hetero-aromatic additive of from 50:1 to 1:2, but preferably in a weight ratio of 10:1 to 2:1.

The invention will be better understood by reference to the following examples.

EXAMPLE 1

| | |
|---|---|
| Potassium chloride | 100 grams |
| tannic acid | 50 grams |
| water | to 1 liter |

EXAMPLE 2

| | |
|---|---|
| Potassium chloride | 100 grams |
| 2,3-pyrazinedicarboxylic acid | 19 grams |
| water | to 1 liter |

EXAMPLE 3

| | |
|---|---|
| Potassium chloride | 100 grams |
| 2,3-pyrazinedicarboxylic acid | 10 grams |
| water | to 1 liter |

In examples 1–3, a chelating agent was not used in the formulation as the recording media prepared by impregnation with electrolyte solutions were for test purposes only, and background discoloration was not a concern. To determine the effect of the hetero-aromatic additive, high resolution spectrophotometry was used. Normalized spectra were obtained which permitted ready mark comparison of different electrolyte compositions irrespective of concentration. From the tests performed, it was found that the color and tone of the formed mark using a recording medium prepared with the formulation of examples 1 and 2. Moreover, as evidenced by the normalized spectral response, the differential in mark density was greater than additive or cumulative thereby evidencing a synergistic reaction between the hetero-aromatic additives and the marking compound.

Other examples of electrolyte solutions in accordance with this invention include:

EXAMPLE 4

| | |
|---|---|
| Potassium chloride | 100 grams |
| methylenedisalicylic acid | 100 grams |
| the disodium salt of ethylene-diaminetetraacetic acid | 2 grams |
| 2,3-pyrazinedicarboxylic acid | 50 grams |
| water | to 1 liter |

EXAMPLE 5

| | |
|---|---|
| Potassium chloride | 50 grams |
| sodium chlorate | 100 grams |
| methylenedisalicylic acid | 50 grams |
| the disodium salt of ethylene-diaminetetraacetic acid | 0.6 grams |
| 2,3-pyrazinedicarboxylic acid | 25 grams |
| water | to 1 liter |

EXAMPLE 6

| | |
|---|---|
| Potassium chloride | 100 grams |
| pamoic acid disodium salt | 25 grams |
| 2-pyridinecarboxylic acid | 25 grams |
| water | to 1 liter |

EXAMPLE 7

| | |
|---|---|
| Potassium chlorate | 90 grams |
| catechol | 90 grams |
| thiourea | 2 grams |
| monobasic sodium phosphate | 2 grams |
| 3-pyridazinecarboxylic acid | 4 grams |
| water | to 1 liter |

EXAMPLE 8

| | |
|---|---|
| Lithium chloride | 100 grams |
| catechol | 90 grams |
| thiourea | 2 grams |
| disodium salt of the ethylene-diaminetetraacetic acid | 0.9 grams |
| water | to 1 liter |

EXAMPLE 9

| | |
|---|---|
| Lithium sulfate | 100 grams |
| methylenedisalicylic acid | 100 grams |
| disodium salt of the ethylene-diaminetetraacetic acid | 1.0 grams |
| 5-methoxy-2,3-pyrazinedicarboxylic acid | 75 grams |

| -continued | |
|---|---|
| water | to 1 liter |

Each of the aforesaid formulations provide an electrolytic recording medium capable of forming marks of improved color, tone and definition over previous marking solutions such as Example 1.

I claim:

1. In an electrolytic recording medium comprising a porous support impregnated with an electrolytically conducting aqueous solution of a strong electrolyte and a marking compound, the improvement comprising the addition of a six-membered hetero-aromatic nitrogen-containing compound of the formula:

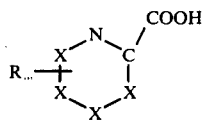

where each X is a member selected from the group consisting of nitrogen and carbon; and R is a member selected from the group consisting of hydrogen, halogen, hydroxyl, lower aliphatic radicals of 1–6 carbons, carboxyl, sulfo and alkoxy-radicals, said carboxyl, sulfo and alkoxy radicals being substituted with a member from the group consisting of hydrogen and lower aliphatic radicals of 1–6 carbons and $m$ is a whole integer varying between 1 and 5.

2. The electrolytic recording medium of claim 1 where the six-membered hetero-aromatic nitrogen-containing compound is selected from the group consisting of 2-pyridinecarboxylic acids, 2-pyridazinecarboxylic acids, 2-pyrazinecarboxylic acids, 2-pyrimidinecarboxylic acids, 1,2,4-triazine-6-carboxylic acids, and 1,2,4,5-tetrazine-3-carboxylic acids.

3. The electrolytic recording medium of claim 2 wherein the six-membered hetero-aromatic nitrogen-containing compound is 2,3-pyrazinedicarboxylic acid.

4. The electrolytic recording medium of claim 2 wherein the six-membered hetero-aromatic nitrogen-containing compound is 2-pyridinedicarboxylic acid.

5. The electrolytic recording medium of claim 2 wherein the six-membered heter-aromatic nitrogen-containing compound is 2-pyridinecarboxylic acid.

6. The electrolytic recording medium of claim 1 where said marking compound is selected from the group consisting of methylenedisalicylic acid, tannic acid, gallic acid, any polyhydroxy benzene, methyl gallate catechol, pyrogallol, protocatechiuc acid, 8-hydroxy-quinoline, salicylic acid, pamoic acid, salicylaldoxime and dihydroxyphenylacetic acid.

7. The electrolytic recording medium of claim 6 where the weight ratio of said marking compound to said hetero-aromatic nitrogen-containing compound varies from 20:1 to 1:1.

8. The electrolytic recording medium of claim 1 including a chelating agent to retain stray recording metal ions in colorless form at non-recording parts of said support.

9. In an improved method of electrolytic recording comprising passing a porous support between recording electrodes, said support being impregnated with an aqueous solurion comprising a strong electrolyte and a marking compound, the improvement comprising the addition to said aqueous solution of a six-membered hetero-aromatic nitrogen-containing compound of the formula:

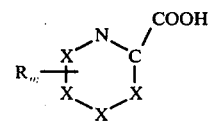

where each X is selected from the group consisting of nitrogen and carbon and R is selected from the group consisting of hydrogen, halogen, hydroxyl, lower aliphatic radicals of 1–6 carbons, carboxyl sulfo and alkoxy radicals, said carboxyl, sulfo and alkoxy radicals being substituted with a member from the group consisting of hydrogen and lower aliphatic radicals of 1–6 carbons, and $m$ is a whole integer varying between 1 and 5.

10. The method of claim 1 where the six-membered hetero-aromatic nitrogen-containing compound is 2,3-pyrazinedicarbosylic acid.

11. The method of claim 9 where the six-membered hetero-aromatic nitrogen-containing compound is 2,3-pyridinedicarboxylic acid.

12. The method of claim 9 wherein the six-membered hetero-aromatic nitrogen-containing compound is 2-pyridinecarboxylic acid.

13. The method of electrolytic recording of claim 9 wherein the impregnation of said support includes a chelating agent to retain stray recording metal ions in colorless form at non-recording parts of the support.

* * * * *